(No Model.)
E. RASMUSSEN.
ELECTRIC CLAMP.
No. 458,188. Patented Aug. 25, 1891.
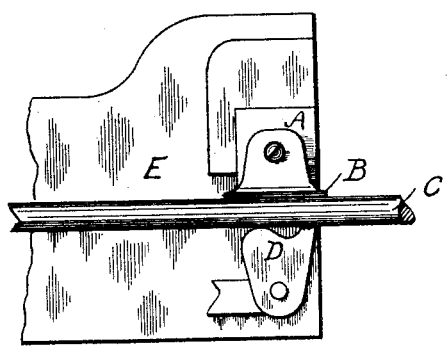
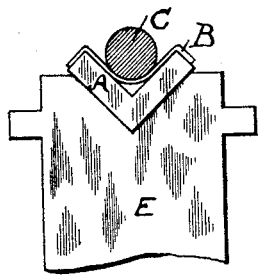
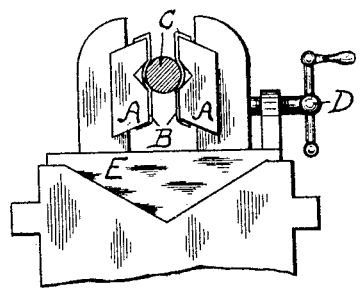
WITNESSES
H. P. Maxim
[signature]
INVENTOR
Einar Rasmussen
By N. N. Sweet
Atty

UNITED STATES PATENT OFFICE.

EINAR RASMUSSEN, OF LYNN, MASSACHUSETTS, ASSIGNOR TO THE THOMSON ELECTRIC WELDING COMPANY, OF MAINE.

ELECTRIC CLAMP.

SPECIFICATION forming part of Letters Patent No. 458,188, dated August 25, 1891.

Application filed December 19, 1890. Serial No. 375,202. (No model.)

*To all whom it may concern:*

Be it known that I, EINAR RASMUSSEN, a subject of the King of Norway and Sweden, and residing in Lynn, in the county of Essex and State of Massachusetts, have invented a new and useful Improvement in Electric Clamps, of which the following, taken in connection with the accompanying drawings, is a specification.

My invention relates to an improvement in apparatus for electric metal-working, and has reference to the devices which make contact with and deliver current to the pieces to be operated upon.

In the art of electric welding and metal-working the current used is of very large volume and low intensity, and unless good electrical connection is provided between the several conducting parts heat is generated at the points of contact, thus materially increasing the resistance and causing a considerable waste of power.

In the commercial operation of electric metal-working apparatus it is found that the metals worked are often rough and dirty on their surfaces and must be used in this condition, in order not to increase the cost by expensive methods of preparation previous to the welding or other operation. The continual abrasive action of these rough surfaces upon the conductor-terminals or contact-blocks causes a rapid and unequal wearing away of the contact-pieces, thus lessening their conducting-surface and greatly increasing the power required.

The object of my invention is to provide means whereby the surfaces of the clamps are protected from the abrasive action of the work-pieces and the best of electrical connection obtained between said clamps and work-pieces.

My invention consists of the combination of a yielding piece of good conducting material with the conducting devices of electric welding and metal-working apparatus.

I prefer for the purposes of my invention a thin piece of soft copper, owing to its excellent conductivity and also because it is yielding and will allow any roughness or slight irregularities in the work-pieces to be pressed into it, thereby making good contact over a maximum amount of surface.

Illustrations of the manner of applying my invention to metal-working apparatus are shown in the accompanying sheet of drawings.

Figure 1 is a plan view of electric metal-working clamp showing the application of my invention. Figs. 2 and 3 show my invention applied to other forms of electric clamping devices.

In Fig. 1 the part E is one terminal of a source of current. Attached to this and in good electrical connection therewith is the contact-block A, which is made of hard copper or a good conducting alloy.

C is the work-piece held in contact with the conducting-block by the jaw D.

At B is represented the thin piece of soft conducting material—such as copper ribbon or the like—which is especially referred to in this specification.

Fig. 2 illustrates the application of my invention to the ordinary form of V-shaped clamps, and Fig. 3 shows the same applied to a special form of clamping device.

Having thus described my invention, what I claim is—

1. In electric metal-working apparatus, the combination, with conducting blocks or clamps, of a yielding material of good conductivity in contact therewith, substantially as and for the purpose described.

2. Electric clamps of welding or metal-working apparatus having the whole or a portion of their contact-surfaces covered by a yielding conducting material, substantially as described.

In testimony whereof I have signed my name to this specification, in the presence of two subscribing witnesses, on this 16th day of December, A. D. 1890.

EINAR RASMUSSEN.

Witnesses:
JOHN W. GIBBONEY,
WARREN B. LEWIS.